Figure 1:
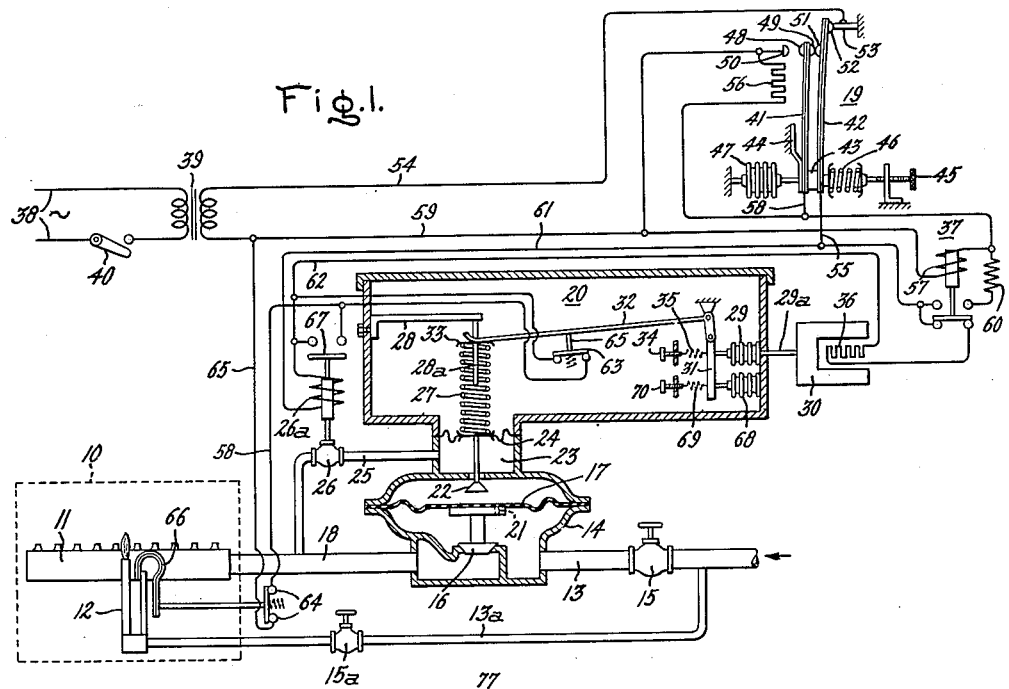

March 3, 1953  C. F. SUESSEROTT  2,630,273
THERMOSTATIC CONTROL FOR HEATING SYSTEMS
Filed March 23, 1950  2 SHEETS—SHEET 1

Inventor:
Charles F. Suesserott,
by William G. Edwards, Jr.
His Attorney.

Inventor:
Charles F. Suesserott,
by William G. Edwards, Jr.
His Attorney.

Patented Mar. 3, 1953

2,630,273

UNITED STATES PATENT OFFICE 2,630,273

THERMOSTATIC CONTROL FOR HEATING SYSTEMS

Charles F. Suesserott, West Caldwell, N. J., assignor to General Electric Company, a corporation of New York Application March 23, 1950, Serial No. 151,415

5 Claims. (Cl. 236—80)

My invention relates to thermostatic controls for heating systems and particularly to temperature modulating controls for heating systems such as those having fluid fuel burners.

In heating systems employing fluid fuel burners, it is sometimes desirable to provide a burner which may be regulated over a relatively wide range to provide a graduated supply of heat, and the controls for such systems are arranged to modulate the supply of heat in accordance with the demand for heat as determined, for example, by a room thermostat. In such systems, the thermostat may become satisfied when the rate of flow of fuel is relatively low, and because of faulty starting characteristics encountered when a burner is again ignited with the fuel supply set at a relatively low value it is desirable to provide some arrangement for preventing the reigniting of the burner until the fuel can be supplied at a sufficient rate to insure proper ignition and starting. Accordingly, it is an object of my invention to provide a heating system having a fluid fuel burner and including an improved arrangement for thermostatically controlling the system and for insuring the restarting of the system only when an adequate fuel supply is available.

It is another object of my invention to provide a modulating thermostatic control for gas furnaces and the like including a motor actuated valve for varying the rate of flow of gas and an improved arrangement for preventing starting of the gas burner until the flow control valve is positioned for a high rate of flow.

Further objects and advantages of my invention will become apparent as the following description proceeds, and the features of novelty which characterize my invention will be pointed out with particularity in the claims annexed to and forming a part of this specification.

In carrying out the objects of my invention, I provide a burner control system including a thermostat and a motor actuated by the thermostat to position a fuel control valve in accordance with the heating demand as determined by the thermostat. In order to prevent starting of the burner by the pilot flame when the main supply valve is in a position for a low rate of flow, I provide a control circuit actuated by the positioning motor so that when the flow of gas reaches a predetermined minimum it is shut off and cannot be restored until the flow control valve has been returned to a position for a predetermined high rate of flow.

Figure 2:
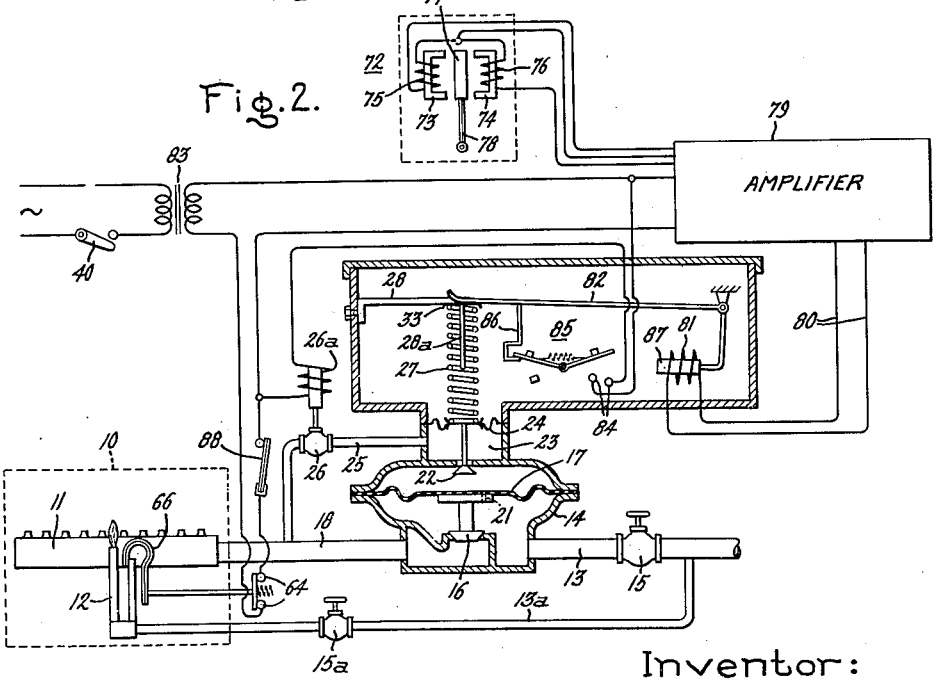
Figure 3:
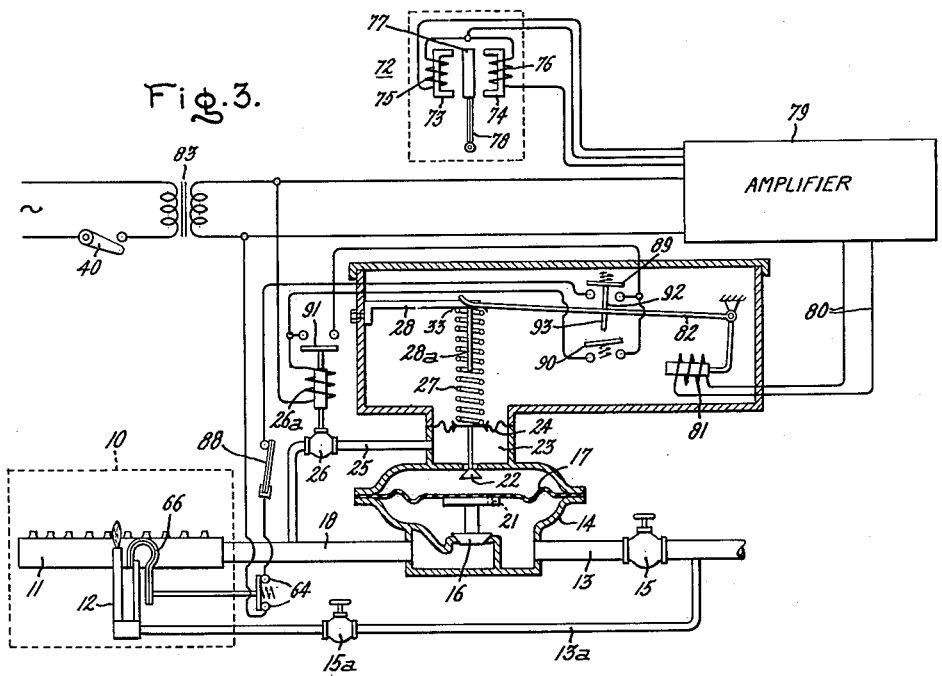
Figure 4:
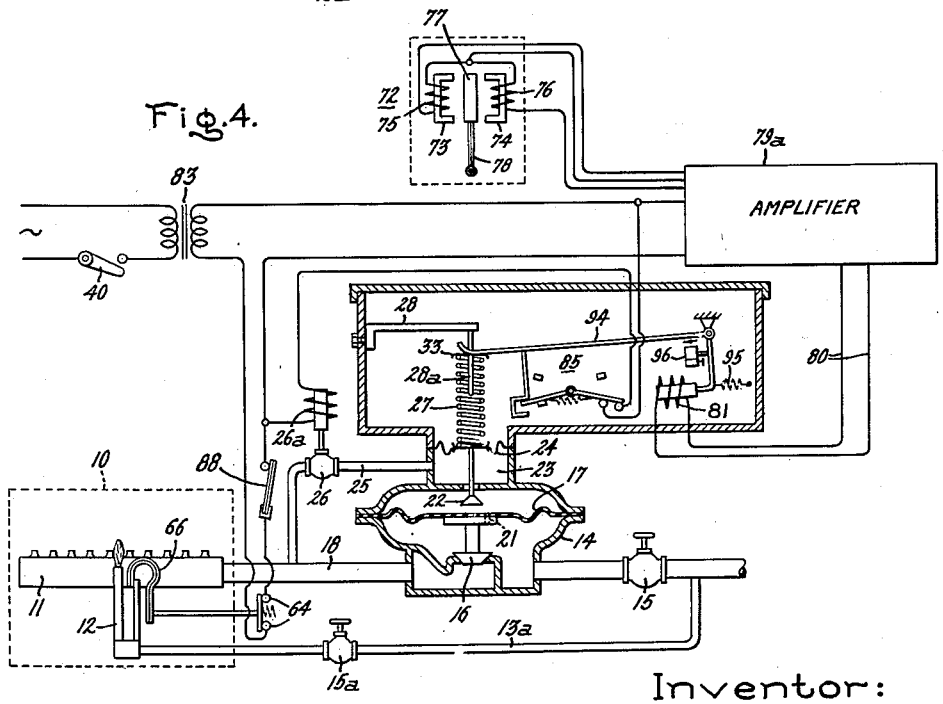

For a better understanding of my invention, reference may be had to the accompanying drawings in which Fig. 1 illustrates a heating system embodying my invention and including a gas burner and a cycling blade type of modulating thermostat; Fig. 2 illustrates another embodiment of my invention in connection with a variable reactance type of thermostatic control; Fig. 3 illustrates another modification of my invention similar to that of Fig. 2; and Fig. 4 illustrates a still further embodiment of my invention.

Referring now to the drawing, the heating system illustrated in Fig. 1 includes a furnace 10 having a gas burner 11 and a pilot burner 12 and supplied with fuel gas from a conduit 13 under control of a main valve 14. Manual shut-off valves 15 and 15a are provided in the conduit 13 and pilot line 13a respectively. The main valve 14 is of the differential pressure diaphragm actuated type and includes a valve element 16 mounted on a diaphragm 17 in a position to control the passage of gas from the supply line 13 through the valve casing to the furnace supply conduit 18. The valve 14 is controlled in accordance with the demands for heating as determined by a room thermostat 19. The actuation of the valve in accordance with the heat demand is effected through operation of a control 20. The valve 16 is positioned in accordance with the difference in pressure prevailing on the upper and lower sides of the diaphragm 17 within the casing of the valve 14. In order to effect this control, a by-pass gas circuit is provided around the valve 16 and comprises an orifice 21 in the diaphragm assembly, an auxiliary control or pilot valve 22 which opens into a by-pass comprising a chamber 23 closed by a flexible diaphragm 24, and a conduit 25 leading to the conduit 18 on the outlet side of the valve 16. A normally closed solenoid actuated valve 26 is provided in the conduit 25 to effect selective control of the by-pass circuit. When the valve 26 is closed the pressure is equalized on the two sides of the diaphragm 17 and the valve 16 is held closed. When the valve 26 is opened by energization of its solenoid winding 26a the pressure on the upper side of the diaphragm may be relieved provided the valve 22 is also open, and the difference in pressure between the upper and lower sides of the diaphragm may thus be controlled by the position of the valve 22 acting as a throttling valve in the by-pass circuit.

In order to control the flow of gas through the valve 16 in accordance with the heating demand as determined by the thermostat 19, a heat motor or actuator comprising a bellows 29 and a heat chamber 30 connected by a duct 29a are arranged to control the position of the valve by moving a bar or link 31 which is pivoted to a bell crank 32. The bell crank 32 has a forked end which straddles a supporting arm 28 and bears on a spring cap or disk 33 constituting a retaining member for a spring 27 which acts between the cap and the diaphragm 24. The disk 33 is slidably mounted on a guide rod 28a attached to the support 28. The valve 22 normally floats in a balanced, slightly open position determined by the calibration of the spring 27 acting between the diaphragm 24 and the disk 33. The heat motor may be calibrated or adjusted by turning a knob 34 for compressing a spring 35 opposing the bellows. At the lower end of the range of operating temperatures of the actuator 30, the bellows 29 contracts, causing counterclockwise movement of the crank 32 and thereby moving the valve 22 to its fully open position. Heat is supplied to the actuator chamber 30 by an electric heater 36 under control of the thermostat 19, this heater being energized whenever a relay 37 is in its drop-out position. Excitation for the control circuit is supplied from lines 38 through a transformer 39, a main switch 40 being provided in the supply lines to the primary winding of the transformer.

The thermostat 19 comprises a main cycling bimetallic blade 41 and a bimetallic maximum temperature limit blade 42. The blades 41 and 42 are connected together rigidly at one end by an insulating block 43 and are mounted for hinging movement on a spring member 44. The position of the blades may be set by adjusting a knob 45 to control the compression of a spring 46 bearing on the common ends of the blades and opposed by a bellows 47 which is responsive to ambient temperature and provides a compensating bias for variations in ambient temperature. The blade 41 is provided with front and back contacts 48 and 49, the contact 48 being arranged to engage a stationary contact 50 and the contact 49 upon opposite movement to engage a contact 51 on the limit blade 42. At temperatures below the desired maximum value, the limit blade maintains engagement of a contact 52 and a stationary contact 53. This connects the secondary winding of the transformer 39 through a line 54 to a main supply lead or line 55, and thus the entire control is deenergized when the temperature of the room air rises above the predetermined maximum temperature for the operation of the system.

During the operation of the system, if the control elements are in the positions illustrated in the drawing and the switch 40 is closed, a circuit is completed to energize a heater 56 and a winding 57 of the relay 37. This circuit may be traced from the line 54 at one side of the secondary of transformer 39, contacts 53, 52, blade 42, contacts 51 and 49, and blade 41 to a lead 58, thence through the heater 56 and winding 57 in parallel, to a line 59 connected to the other side of the secondary of the transformer 49. Energization of the coil 57 picks up the relay 37, and the coil is thereafter maintained energized by a holding circuit including the upper contacts of the relay and a holding resistor 60 connected between the lines 55 and 58 so that the relay will be maintained in its picked up position even though contacts 49 and 51 separate. A second circuit is established on closing of the switch 40 to energize the winding 26a of the valve 26. This circuit may be traced from the line 54 through the contacts 53 and 52, the blade 42 and line 55 and through a connection 61 to the winding 26a and thence through a connection 62 and switches 63 and 64 to a line 65 connected to the other side of the secondary of the transformer 39. The winding 26a is energized provided the switches 63 and 64 are closed. The switch 63 is closed when the bell crank 32 is in its lowermost position so that a finger 65 thereon presses the normally open switch 63 into its closed position, as shown on the drawing, and the switch 64 is maintained closed by operation of a bimetal safety thermostat 66 provided the pilot 12 is burning. Energization of the winding 26a opens the valve 26 and closes a switch 67, shunting the switch 63 and providing a holding connection to maintain the winding 26a energized whether or not the switch 63 is closed. The purpose and function of the switch 63 will be described later.

Upon opening of the valve 26, pressure in the chamber on the upper side of the diaphragm 17 is relieved because the valve 22 is open and the valve 16 moves to its fully open position so that ignition of the burner takes place with the maximum flow of gas. The energization of the heater 56 heats the blade 41 and causes it to bend to the left until contact 49 engages contact 50 thereby shorting out the coil 57 and deenergizing relay 37 so that it drops out, closing its lower contacts and connecting the heater 36 between the lead 55 and the lead 62, thereby energizing the heater and supplying heat to the chamber 30. Deenergizing of relay 37 opens the circuit to the heater 56, which then cools, causing the blade 41 to cool and move to the right until the contacts 49 and 51 engage, thereby again energizing the winding 57 and picking up the relay 37 to disconnect the heater 36. It will thus be apparent that the thermostat blade 41 cycles back and forth between its front and back contacts and energizes the heater 36 during the period when the thermostat heater 56 is cooling. The contacts 48 and 50 have been shown in the drawing with substantial separation for purposes of illustration; however, these contacts are quite closely spaced in practice. For example, the change from engagement with the front contact to engagement with the back contact may be effected upon a change in temperature of blade 41 of, say, ½° F. Blade 41 takes its temperature from the space in which it is located and also from the heater 56. Heat supplied by heater 56 is at a constant rate as long as the heater is energized. The room temperature will vary and thus the ratio of time "on" to "total operating time" for heaters 36 and 56 will vary as the room temperature varies with the addition of the compensating effect of bellows 47. As a result the heat input to the chamber 30 is substantially determined by the per cent of the total operating time during which the contacts 49 and 50 are in engagement. The heat motor is constructed to integrate the amounts of heat supplied by the heater 36 and to move the bell crank 32 in accordance with the heat demand as determined by the thermostat 19. Thus the position of the valve 22 effected by expansion or contraction of the bellows 29 varies in accordance with the heat demand so that the total flow of fuel through the valve 16 is also varied accordingly. The control 20, and particularly the bellows 29, is affected by ambient temperature, and in order to provide a compensating bias a bellows 68 is arranged to act on the link 31 in opposition to a spring 69 which may be adjusted by a knob 70.

Should the room temperature at the thermostat 19 exceed the predetermined desired maximum value, the limit blade 42 will bend to the left thereby separating contacts 52 and 53 and deenergizing the entire control circuit so that the valve 26 is closed and the further supply of gas to the burner through the valve 16 is prevented.

From a consideration of the control system just described it will be evident that as the temperature of the room approaches the desired temperature, as determined by the thermostat 19, the flow of gas through the valve 16 will be decreased accordingly. In order to insure satisfactory operation and freedom from faulty performance, it has been found desirable to prevent decrease of the flow of fuel below some minimum value, say 20% of the full flow. For this reason, the valve 22 is never fully closed by operation of the bell crank 32, the extreme upper position of the valve corresponding to about 20% flow of fuel. Furthermore, when the main burner is ignited it is desirable that a relatively high rate of gas be flowing, and preferably the gas should be flowing at full rate or 100% of the burner capacity. The high rate of flow prevents faulty starting from flashback or other undesirable results.

It is the purpose of the normally open switch 63 to insure the uniform and satisfactory operation of the system. Should the valve 26 be closed for any reason when the control 20 is in any position other than the full flow position illustrated in the drawing, the burner may not again be started until the actuator 30 has cooled to allow the bellows 29 to contract and the bell crank 32 is in a counterclockwise position so that the finger 65 presses the switch 63 to its closed position, as shown on the drawing. In this position of the valve 22, the valve 16 will assume its full open position as soon as the winding 26a is reenergized to open the valve 26. It is thus evident that the burner cannot be restarted after deenergization of the control circuit until such time as the switch 63 has been closed. Since the bell crank 32 cannot move the valve 22 upward beyond a predetermined minimum flow position, as determined by the support 28 which stops further upward movement of the disk 33, the supply of fuel to the burner 11 cannot be decreased below this predetermined value. Consequently, should heating of the room air be continued, the blade 42 will break engagement of the contacts 52 and 53 and deenergize the electrical circuits. It is thus apparent that the system cannot be operated below the predetermined minimum capacity of the burner and that after deenergization by operation of the limit thermostat the burner cannot again be ignited until the required full flow of fuel can be effected by cooling of the heat motor and rotation of the crank 32 to close the switch 63.

The heating system illustrated in Fig. 2 includes the same type of regulating valve 14 as that shown in Fig. 1 and corresponding parts of this system have been designated by the same numerals as employed in Fig. 1. The system of Fig. 2 employs a thermostat 72 of the variable reactance type and which comprises a pair of C-shaped magnets 73 and 74 having coils 75 and 76 mounted thereon. The reactances of the two coils are varied oppositely by movement of an armature 77 mounted on a bimetallic strip 78, and the variation in reactance is employed in a suitable control circuit including an amplifier 79, which, for example, may be of the electronic or of the magnetic type and designed to have a direct current output. The amplifier supplies its direct current output through leads 80 for energizing a solenoid 81 constituting a motor or actuator for effecting operation of the valve 14 through a bell crank arm 82. The spring 27 of the valve 14 in this modification is selected with respect to the effective forces of the solenoid 81 so that balanced operation is secured through the bell crank arm 82 and therefore the valve 14 is operated in accordance with the energization of solenoid 81 as determined by the thermostat 72 and amplifier 79. Any form of solenoid motor may, of course, be employed for this purpose, provided it will effect positioning of the arm 82 in accordance with the output of the amplifier 79.

In the circuit of Fig. 2 the solenoid 26a of the valve 26 is connected in a control circuit including the secondary of a transformer 83 which supplies power to the control. There is also included in the circuit of the winding 26a a pair of contacts 84 of a switch 85. Switch 85 is of the overcenter type which snaps from open to closed position and is retained in either position until moved to the other. The switch 85 is actuated by an arm 86 attached to the bell crank 82 and it will be evident from the drawing that as the bell crank rotates in a counterclockwise direction and compresses the spring 27 it will move the left-hand link of the switch 85 until the spring of the switch passes over center and snaps the switch closed. This closing position is designed to correspond to the wide-open position of the valve 22. The bell crank 82 normally rests in the position indicated in the drawing, an armature 87 associated with the solenoid winding 81 providing a gravity bias and the combined effect of the spring 27 and the bias being to hold the valve 22 in its minimum open position. The armature 87 is arranged to be moved to the right and thus to rotate the bell crank 82 in a counterclockwise direction upon energization of the winding 81. Thus after the winding 81 has been deenergized and the valve mechanism returned to the position shown in the drawing, it is necessary that the crank be rotated to its extreme downward position to open the valve 22 wide before the contacts 84 can be closed and energize the winding 26a to resume the flow of fuel. A bimetallic thermostat 88 is provided in the circuit of the safety pilot switch 64. This thermostat, which is an optional limit thermostat, is arranged in the space to be heated and may be located adjacent the thermostat 72. Whenever the temperature of the room rises above a predetermined maximum desired value, the thermostat 88 opens the circuit of the winding 26a and prevents further operation of the system until the temperature has again fallen below the desired maximum and, further, until there has been a sufficient demand for heating to move the bell crank 82 to its extreme counterclockwise position to secure a wide opening of the valve 22 and insure an adequate flow of fuel for starting.

In the system illustrated in Fig. 3, a variable reactance thermostat and solenoid motor like that shown in Fig. 2 have been employed and corresponding parts have been designated by the same numerals. The control of the system in Fig. 3 differs from that in Fig. 2 in the arrangement for insuring the closing of the main valve at a predetermined minimum flow and its opening only after the control has been positioned for a desirable maximum flow. For this purpose, instead of employing the switch 85 of Fig. 2, a normally closed switch 89 and a normally open switch 90 are provided, together with a normally open switch 91 arranged to be actuated upon energization of the solenoid 26a. The switch 89 is held open when the bell crank arm 82 is in the position shown in the drawing, a post 92 on the arm engaging the switch 89 and opening its contacts. When the arm 82 rotates in counterclockwise direction to its lowermost position for holding the valve 22 fully open, a post 93 engages the switch 90 and closes its contacts.

During the operation of the system of Fig. 3, when the switch 40 is closed the output of the amplifier is determined by the operation of the thermostat 72 and the winding 81 is energized in accordance with the demand for heat and rotates the arm 82 in a counterclockwise direction. When the demand is sufficient to move the arm 82 to its lowermost position the switch 90 closes its contacts, thereby connecting the winding 26a of the solenoid across the secondary of the transformer 83. This circuit may be traced from the lower side of the secondary through the switch 64 and thermostat 88, the normally closed switch 89, contacts of the switch 90 through the winding 26a and back to the upper side of the secondary. The valve 26 is thus opened to permit flow of fuel to the burner 11 only after the valve 22 has been opened to a position for a predetermined high rate of flow. Upon operation of the solenoid 26a, the switch 91 closes its contacts and provides a by-pass around the switch 90 so that the winding 26a is maintained energized regardless of movement of the arm 82 upwardly to permit opening of the switch 90. The system continues to operate and supply fuel to the burner 11 in accordance with the heating demand of the system as determined by operation of the thermostat 72. Whenever the heating demand falls sufficiently to return the arm 82 to its upper position, the contacts of the switch 89 are opened and the winding 26a is thereby deenergized to close the solenoid valve 26 and stop the supply of fuel to the burner, whereupon the burner cannot again be ignited until the demand is sufficiently high to move the arm 82 to the full open position of the valve 22. Should the temperature of the room rise above a predetermined permissible maximum, the thermostat 88 will also operate to stop further operation of the burner and to render the valve 14 ineffective until there is again a demand sufficient to require full fuel supply.

The modification illustrated in Fig. 4 is similar to that of Fig. 2 and corresponding parts have been designated by the same numerals. The system of Fig. 4 differs from that of Fig. 2 in that the bell crank arm indicated at 94 is arranged to hold the valve 22 normally in its full open position, and the amplifier indicated at 79a is arranged to increase the excitation of the winding 81 upon a decrease in the demand for heating, this being an opposite effect from that of the amplifier 79 in the other figures of the drawing. The arm 94 is biased to the full open position of valve 22 in any suitable manner, such as by a spring 95, and the switch 85 is thus normally in its closed position and is opened only on movement of the arm 94 to the minimum flow position of the valve 22. During operation of the system shown in Fig. 4, when the switch 40 is closed the winding 81 is energized by the amplifier 79a in accordance with the heating demand, as determined by the thermostat 72, and the coil 81 starts to rotate the arm 94 in a clockwise direction to close the valve 22 should the demand be less than that for a full supply of fuel to the burner 11. In order to prevent closing of the valve 22 until ignition of the burner has taken place, a time delay mechanism, such as a dashpot, indicated at 96 is provided to prevent rapid upward movement of the arm 94 upon closing of the switch 40 or upon closing of either of the switches 64 or 88 in the event they have been opened. The dashpot 96 thus prevents faulty starting of the burner by maintaining full flow of fuel for sufficient time to afford proper ignition.

While I have illustrated specific embodiments of my invention as applied to control systems for furnaces having gas burners, other applications will readily be apparent to those skilled in the art. I do not, therefore, desire my invention to be limited to the particular arrangements illustrated and described, and I intend by the appended claims to cover all modifications within the spirit and scope of my invention.

What I claim as new and desire to secure by Letters Patent of the United States is:

1. In a control for a heating apparatus having a gas burner, the combination of a differential gas pressure operated main valve for controlling the supply of gas to the burner, an auxiliary valve for controlling the differential gas pressure effective on said first valve, a solenoid valve having an open position for rendering said auxiliary valve effective and a closed position for rendering said auxiliary valve ineffective and thereby closing said main valve and preventing the flow of gas to said burner, means responsive to a temperature affected by the burner and including an actuator for positioning said auxiliary valve to vary the rate of flow of gas through said main valve, and means including a switch in the circuit of the solenoid of said solenoid valve and arranged to be operated by said actuator for closing said solenoid valve and thereby said main valve upon movement of said auxiliary valve to a predetermined minimum flow position and for preventing opening of said solenoid valve to reopen said main valve until said actuator has moved to position said auxiliary valve for a substantially greater opening of said main valve.

2. In a control for a heating apparatus having a gas burner, the combination of a differential gas pressure operated main valve for controlling the supply of gas to the burner, an auxiliary valve for controlling the differential gas pressure effective on said first valve, a normally closed valve having an open position for rendering said auxiliary valve effective and in its closed position rendering said auxiliary valve ineffective and thereby closing said main valve and preventing the flow of gas to said burner, means responsive to a temperature affected by the burner and including an actuator for positioning said auxiliary valve to vary the rate of flow of gas through said main valve, an electrical circuit including a solenoid for moving said normally closed valve to its open position, and a two-position switch in said circuit and operated by said actuator for controlling said solenoid and determining the position of said normally closed valve, said switch being closed when said actuator is positioned for a substantially full opening of said auxiliary valve and being moved to its open position when said auxiliary valve has been moved to a predetermined minimum flow position and said switch being movable again to its closed position only upon movement of said actuator to a predetermined materially increased flow position of said auxiliary valve.

3. In a control for a heating apparatus having a gas burner, the combination of a differential gas pressure operated main valve for controlling the supply of gas to the burner, an auxiliary valve for controlling the differential gas pressure effective on said first valve, a normally closed valve having an open position for rendering said auxiliary valve effective and in its closed position rendering said auxiliary valve ineffective and thereby closing said main valve, means responsive to a temperature affected by the burner and including an actuator for positioning said auxiliary valve to vary the rate of flow of gas through said main valve, an electrical circuit including a solenoid for moving said normally closed valve to its open position, a normally closed switch and a first normally open switch connected in series in said circuit for controlling the energization of said solenoid, said first normally open switch being connected to be closed by said actuator upon movement to effect a predetermined wide opening of said auxiliary valve, a second normally open switch shunting said first normally open switch and connected to be closed upon actuation of said solenoid for maintaining said solenoid energized regardless of the position of said first normally open switch, and means operated by said actuator upon movement to effect a predetermined minimum opening of said auxiliary valve for opening said normally closed switch to deenergize said solenoid whereby said solenoid cannot again be energized until said actuator moves to again effect said predetermined wide opening of said auxiliary valve.

4. In a fluid heating system having a heating medium supply device for supplying variable amounts of heat to the fluid to be heated over a predetermined range and a thermostat for determining the demand for heating of said fluid, an actuator for positioning said device, means biasing said actuator to its position for minimum flow of heating medium, means for energizing said actuator to control the flow of heating medium in accordance wtih the demand for heat as determined by said thermostat, means including a normally closed solenoid valve for stopping the supply of heating medium, means including a switch in the circuit of said solenoid valve and connected to be selectively shifted to its on and off positions by movement of said actuator to maximum and minimum flow positions respectively whereby upon reenergization of said actuator after a return to its biased position said system can be restored to heating operation only when said actuator is positioned for a maximum rate of flow of heating medium.

5. In a fluid heating system having a heating medium supply device for supplying variable amounts of heat to the fluid to be heated over a predetermined range and a thermostat for determining the demand for heating of said fluid, an actuator for positioning said device, means biasing said actuator to its position for maximum flow of heating medium, means for energizing said actuator to control the flow of heating medium in accordance with the demand for heat as determined by said thermostat, means effective upon movement of said actuator to its minimum flow position for stopping the supply of heating medium, means for effecting restoration of the supply of heating medium only upon return of said actuator to its biased position, and means for damping the movement of said actuator away from its biased position upon a demand for a decreased flow of heating medium.

CHARLES F. SUESSEROTT.

REFERENCES CITED

The following references are of record in the file of this patent:

UNITED STATES PATENTS

| Number | Name | Date |
| --- | --- | --- |
| 1,862,373 | Shivers | June 7, 1932 |
| 2,051,295 | Gauger | Aug. 18, 1936 |
| 2,116,605 | Kelly | May 10, 1938 |
| 2,244,555 | Harris | June 3, 1941 |
| 2,245,773 | Grant | June 17, 1941 |
| 2,292,830 | Gauger | Aug. 11, 1942 |
| 2,308,275 | Gauger | Jan. 12, 1943 |
| 2,376,525 | Taylor | May 22, 1945 |